United States Patent

Wallace

[11] Patent Number: 5,836,721
[45] Date of Patent: Nov. 17, 1998

[54] POWDER COATING APPARATUS

[76] Inventor: John S. Wallace, 977 Yarmouth Rd., Bloomfield, Mich. 48301

[21] Appl. No.: 705,727

[22] Filed: Aug. 30, 1996

Related U.S. Application Data

[62] Division of Ser. No. 285,304, Aug. 3, 1994, Pat. No. 5,656,325.

[51] Int. Cl.$^6$ ................................................. B65G 53/40
[52] U.S. Cl. ............................. 406/75; 406/32; 406/56; 406/79; 406/117; 198/524; 198/534; 198/568; 198/751; 198/757
[58] Field of Search ................................. 406/32, 53, 56, 406/75, 106, 117, 151, 152, 153, 79; 198/523, 524, 534, 550.1, 550.4, 550.5, 568, 569, 572, 580, 612, 751, 757

[56] References Cited

U.S. PATENT DOCUMENTS

| | | | |
|---|---|---|---|
| 2,921,713 | 1/1960 | Zanotto et al. | 198/757 X |
| 3,023,738 | 3/1962 | Burgess, Jr. | 91/234 |
| 3,091,368 | 5/1963 | Harley et al. | 222/56 |
| 3,097,958 | 7/1963 | Morris | 427/184 |
| 3,125,208 | 3/1964 | Secunda | 198/391 |
| 3,155,545 | 11/1964 | Rocks et al. | 118/621 |
| 3,280,964 | 10/1966 | Burgess, Jr. | 198/757 |
| 3,367,480 | 2/1968 | Burgess, Jr. | 198/768 |
| 3,429,423 | 2/1969 | Pirrello et al. | 198/757 |
| 3,498,352 | 3/1970 | Duffy | 411/302 |
| 3,777,874 | 12/1973 | Birckhead | 406/32 |
| 3,830,902 | 8/1974 | Barnes | 264/267 |
| 4,000,807 | 1/1977 | Molique | 198/443 |
| 4,362,455 | 12/1982 | Hirose | 198/757 |
| 4,371,568 | 2/1983 | von Tell | 427/140 |
| 4,378,897 | 4/1983 | Kattelmann | 222/56 |
| 4,382,527 | 5/1983 | Lerner | 222/56 |
| 4,815,414 | 3/1989 | Duffy et al. | 118/308 |
| 4,865,881 | 9/1989 | Sessa et al. | 427/181 |
| 4,886,011 | 12/1989 | Gelain | 118/308 |
| 4,963,392 | 10/1990 | Molnar et al. | 427/180 |
| 5,090,355 | 2/1992 | DiMaio et al. | 118/681 |
| 5,116,321 | 5/1992 | Gelain | 118/694 |
| 5,143,126 | 9/1992 | Boesch et al. | 141/1 |

FOREIGN PATENT DOCUMENTS 52-71055  6/1977  Japan ................................ 198/954

*Primary Examiner*—Andrew C. Pike
*Attorney, Agent, or Firm*—Longacre & White

[57] ABSTRACT

A powder coating apparatus feeds fine powdered coating material such as thermoplastic type material to a succession of discrete articles passing by the apparatus which includes a vibratory feeder bowl and a spiral track for delivering a substantially constant supply of powdered coating material to the articles. A sensor is also used to regulate an amount of powdered coating material supplied by an auger to the vibratory feeder. The invention also provides a powder feed system that deposits an excess of powdered coating material than that required to form the coating and provides for recirculation of the powder not ultimately used to form the coating back to the powder feeding apparatus.

11 Claims, 5 Drawing Sheets

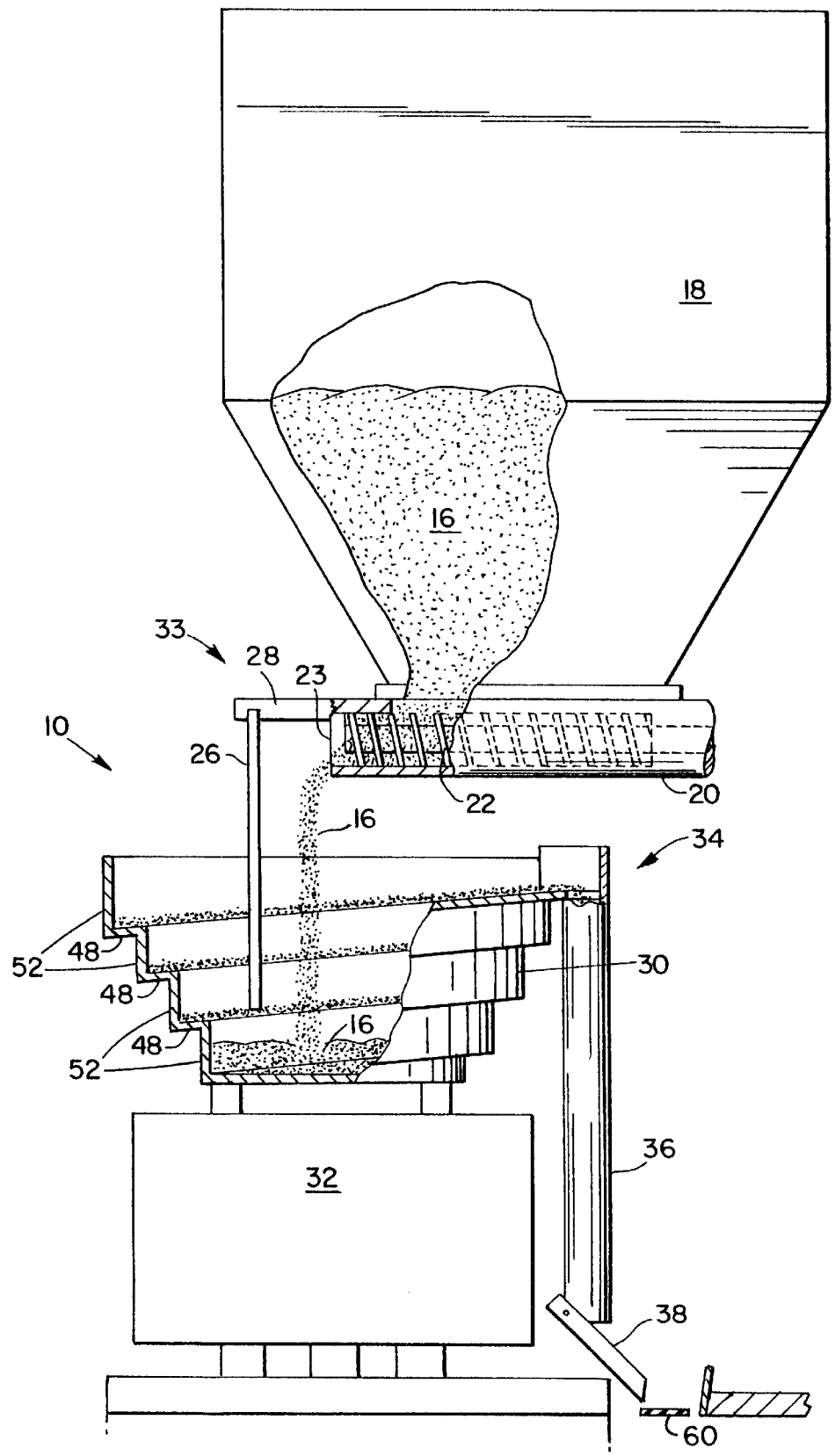

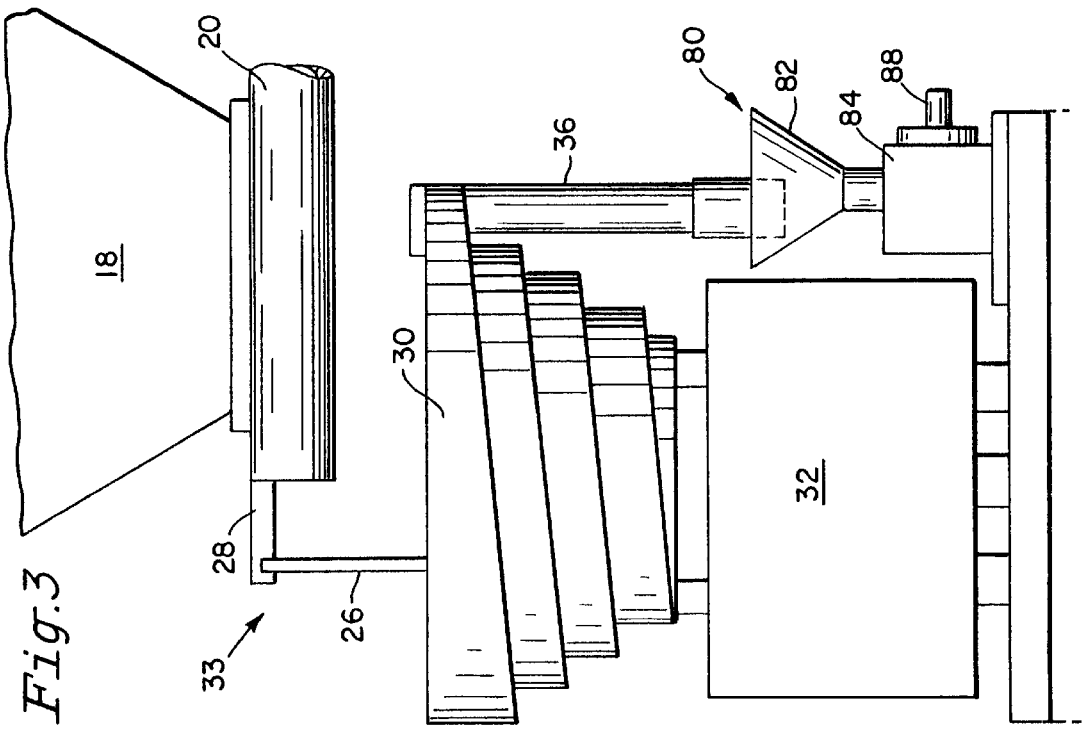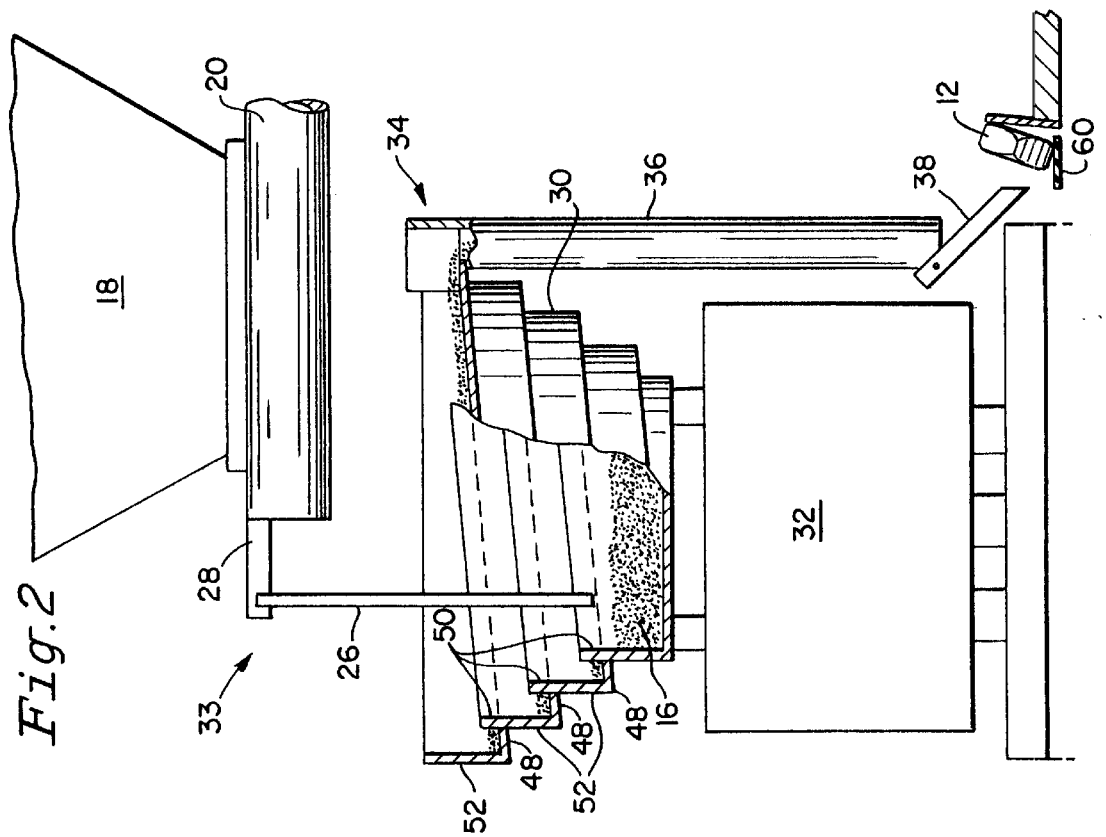

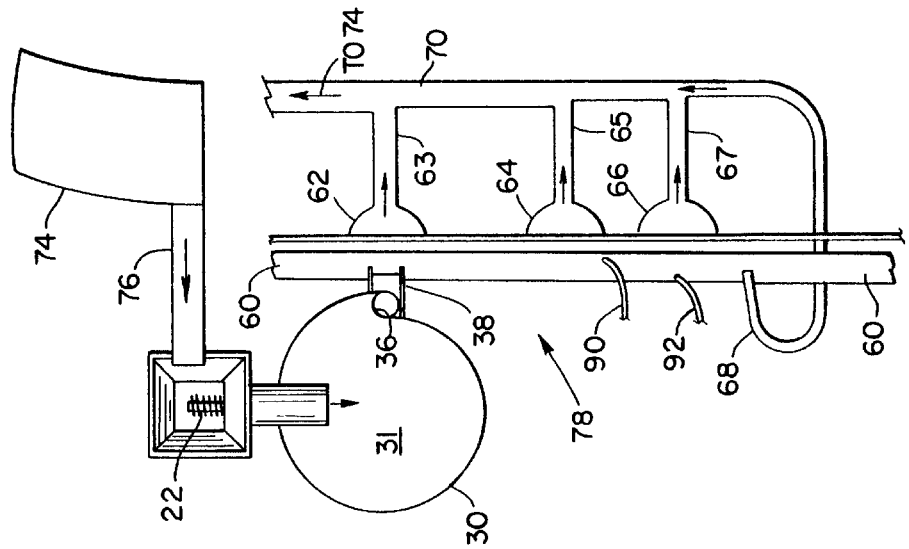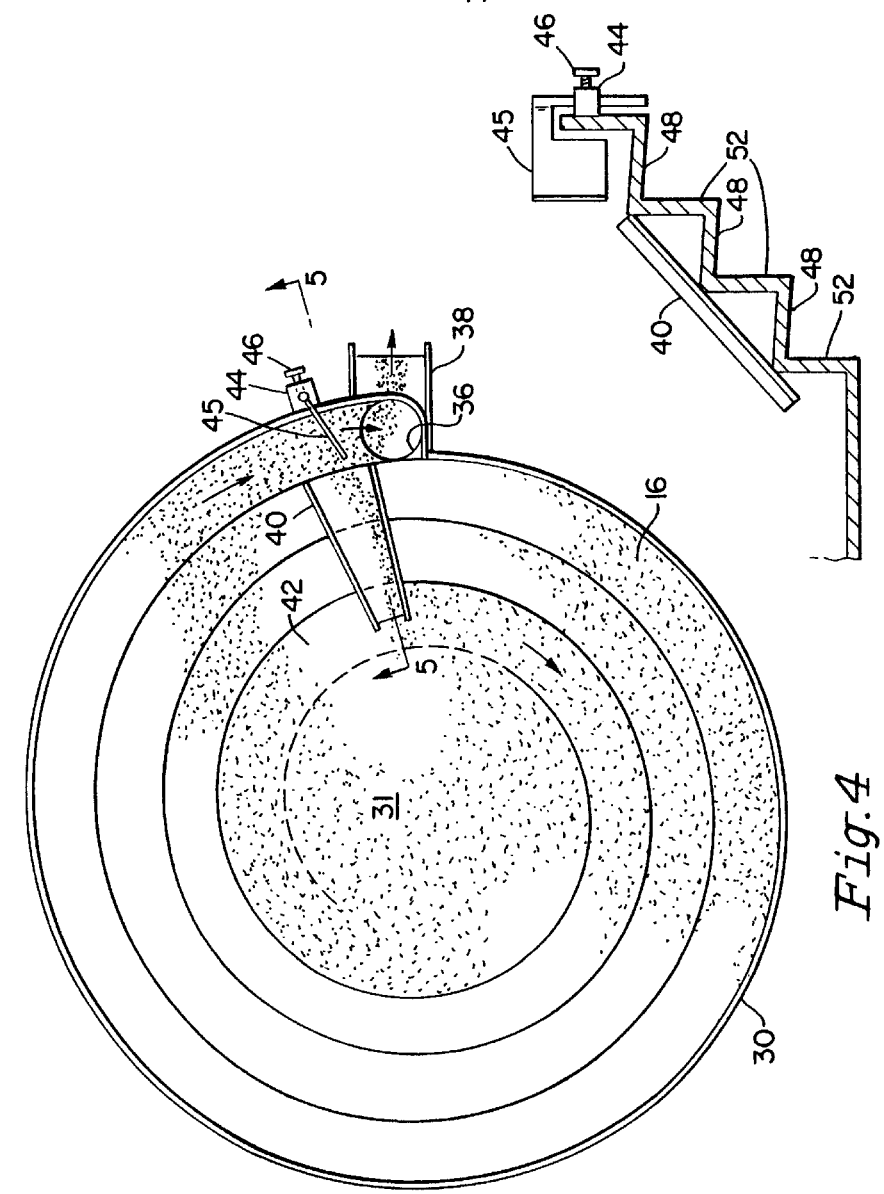

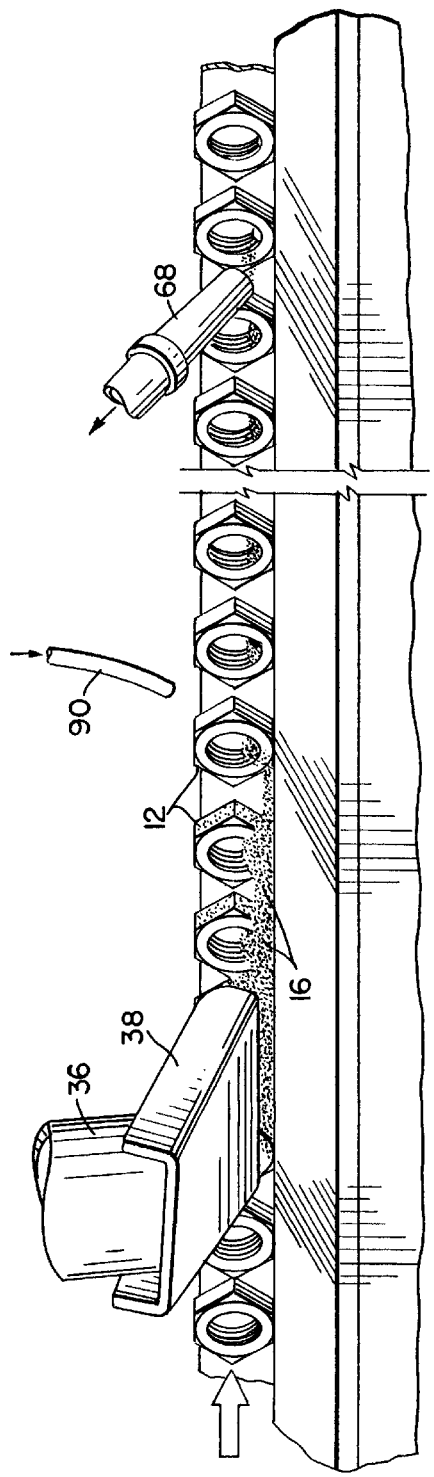
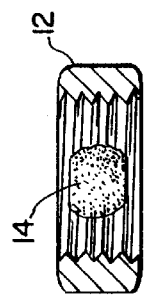
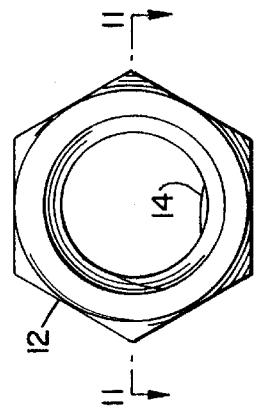
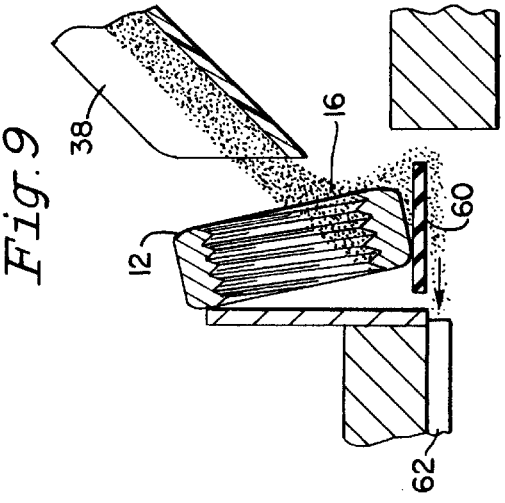

POWDER COATING APPARATUS

This is a division of application Ser. No. 08/285,304, filed Aug. 3, 1994, now U.S. Pat. No. 5,656,325.

BACKGROUND OF THE INVENTION

This invention relates to an apparatus and method for providing powdered coating materials to various types of objects. More particularly, the present invention relates to a method and apparatus for feeding fine powdered coating material such as thermoplastic type material to a succession of discrete articles passing by the apparatus and providing for recirculation of powder not ultimately used to form the coating back to the powder feeding apparatus.

Although the present invention has a wide range of potential applications, it has been found to be particularly efficient in depositing powdered coating material onto fasteners in order to ultimately form a self-locking, insulating, or masking coating on all or a portion of each fastener.

Self-locking fasteners of the type in which the self-locking characteristic is derived from a coating such as a patch of material adhered to all or a portion of the thread-defining surface of the fasteners have proven to be very popular for a wide variety of applications in order to prevent loosening of the fastener due to vibration and the like in various applications. Likewise, demand for thermoplastic masking or insulating coatings on fasteners to protect against subsequent exposure of the fastener to deleterious environments is also increasing.

The prior art discloses various methods and apparatus for applying powdered resilient resin or thermoplastic type material to articles such as fasteners. Required in all of these prior known devices and methods has been the necessity to deliver powdered coating material onto and in the area of the fasteners. Such fasteners have either been preheated and/or are postheated in order to melt the powdered material and fuse it to form a coating on a desired portion of each fastener.

The powder feeding aspect of the manufacture of self-locking fasteners is of critical importance. It is most important to maintain a consistent flow of powdered material that is directed against the fasteners so that the amount of powder that contacts the fastener is substantially identical for successive parts moving past the powder feeding mechanism. This is critical because fasteners so processed to have self-locking elements thereon must meet torque specifications. These specifications are directly related to a proper and consistent application and adherence of the powdered material that ultimately forms the self-locking element on the fastener. Similarly, masking and insulating coatings formed on fasteners from powdered material must exhibit a void-free covering of substantially uniform thickness to be useful.

The powder feed system is also very important because the cost of the powdered material is generally a rather significant element of the cost of production of the coated discrete articles. Therefore it is desirable to precisely control the powder delivery and recirculate powder that is fed to the articles to be coated that is not ultimately retained thereon. In addition, many powder coating materials such as thermoplastics and nylons have a tendency to agglomerate with other particles as a result of the presence of moisture, oils, or humidity in the ambient air surrounding the powder feed mechanism. This agglomeration causes an inconsistent pulsing powder flow that can lead to an uneven application of materials to successive articles passing by the powder flow.

In powder feed systems that utilize an auger in the delivery of powder coating material, this agglomeration problem can be further compounded. If powder material is introduced to the auger in an agglomerated state the auger can effect a packing action on such material resulting in a delivery of unwanted clumps of material rather than an even flow. An unacceptably wide variation in torque values for self-locking fasteners and voids or inconsistent thicknesses in masking and insulating coatings can result from the problems set forth above.

The prior art contains several less than completely adequate solutions to these problems. One group of known systems for feeding powder material toward discrete articles such as fasteners is described in U.S. Pat. No. 3,498,352 to Duffy. In such systems, a supply of powder particles is introduced into a jet nozzle through which a supply of gas under pressure is introduced that entrains the powder and directs it in a stream of particles out the opening of the nozzle and toward the discrete articles. Such systems permit limited control over the powder introduced into the nozzle. There is a significant cost associated with generating and supplying the volume of pressurized air required on a continuous basis by such coating systems. In addition, the powder introduced into the nozzle in such systems is many times rather uneven since the powder particles that are deposited into the nozzle often suffer from significant random agglomeration.

A second type of known powder feed system for supplying powder to a continuous succession of movably supported fasteners is disclosed in U.S. Pat. No. 3,830,902 to Barnes. These types of systems are beneficial in that they eliminate the need for combining the powdered coating material with an airstream. These systems, however, have drawbacks since the powder flowing from the feeder device is subject to significant agglomeration and the rate of powder flow is very difficult to control. Furthermore, these powder feed systems must also have multiple nozzles that are synchronized with each individual fastener passing by the powder feed system. This discontinuous powder flow leads to an uneven application of material to the fasteners passing by the powder feed system.

Vibrating feeder bowls such as those disclosed in Burgess, Jr., U.S. Pat. No. 3,280,964, are also generally known in the art. Most of these feeder bowl constructions, however, are designed to orient and deliver a succession of parts such as fasteners to a device such as a conveyor belt and do not contemplate the delivery of powdered materials.

Vibratory feed systems such as disclosed in U.S. Pat. No. 4,963,392 to Molnar etal. are designed for depositing flock or fiber materials onto the surface of a substrate. This system also requires combining the fibers outputted from the vibratory feed mechanism to be delivered with a pressurized air source which entrains and directs the fibers towards the substrate.

There therefore exists a need in the art for an improved powder coating apparatus and method that provides a continuous, highly controlled, very consistent flow of fine powdered material that is delivered to a succession of articles to be coated such as fasteners without necessitating the combining of the powder flow with a separate airstream to entrain the flow of powder or interrupting the powder flow and indexing it with the flow of discrete articles past the powder feed system.

SUMMARY OF THE INVENTION

It is therefore a principal object of the present invention to provide an improved powder coating apparatus and method that provides efficient control of the flow of powdered material to be supplied to a plurality of discrete objects passing by the apparatus.

It is a further object of the present invention to provide an improved powder coating apparatus and method that enables a continuous, very consistent flow of fine powdered material to a succession of articles to be coated.

It is yet another object of the present invention to provide an improved powder coating apparatus and method that does not necessitate the use of combining the powder flow from the system with a separate airstream to entrain the flow of powder.

It is yet another object of the present invention to provide an improved powder coating apparatus and method that does not require the introduction of the powder flow or indexing of the flow with the discrete articles that pass by the powder feed system.

A still further object of the present invention is to provide an improved powder coating apparatus and method that can be utilized with a variety of different fine powdered materials used to coat a variety of different substrates.

These and other objects are satisfied by an apparatus for feeding powdered material comprising a vibratory feeder bowl, a spiral track in the bowl that extends from the bottom of the bowl to the top of the bowl, means for vibrating the bowl to urge the powdered material along the track at a selectively adjustable rate, adjustable means for exiting powdered material from the bowl, and adjustable means for limiting the amount of powdered material exited from the bowl.

Further objects and advantages of the present invention together with the organization and manner of operation will become apparent from the following description of the invention when taken in conjunction with the accompanying drawings wherein like reference numerals designate like components throughout the several views.

BRIEF DESCRIPTION OF THE DRAWINGS

FIG. 1 is an elevation view showing a partial cross section of a first embodiment of the invention.

FIG. 2 is an elevation view showing a cross section of a second embodiment of the invention.

FIG. 3 is a partial side view of a third embodiment of the present invention.

FIG. 4 is a top view of the embodiment of the present invention illustrated in FIG. 2.

FIG. 5 is a partial cross-sectional view taken along 5—5 in FIG. 4.

FIG. 6 is a diagrammatic view of a recirculating powder system that incorporates a fourth embodiment of the present invention.

FIG. 7 is a detailed partial perspective of the powder exit of the present invention.

FIG. 9 is a partial cross-sectional side view of the embodiment of the powder exit of the present invention illustrated in FIG. 7 utilized to deposit powdered material on and around the area of a threaded fastener.

FIG. 10 is a front view of a typical internally threaded fastener containing a patch of self-locking material.

FIG. 11 is a cross-sectional view taken along the line of 11—11 in FIG. 10.

DETAILED DESCRIPTION OF THE INVENTION

Figure 8:
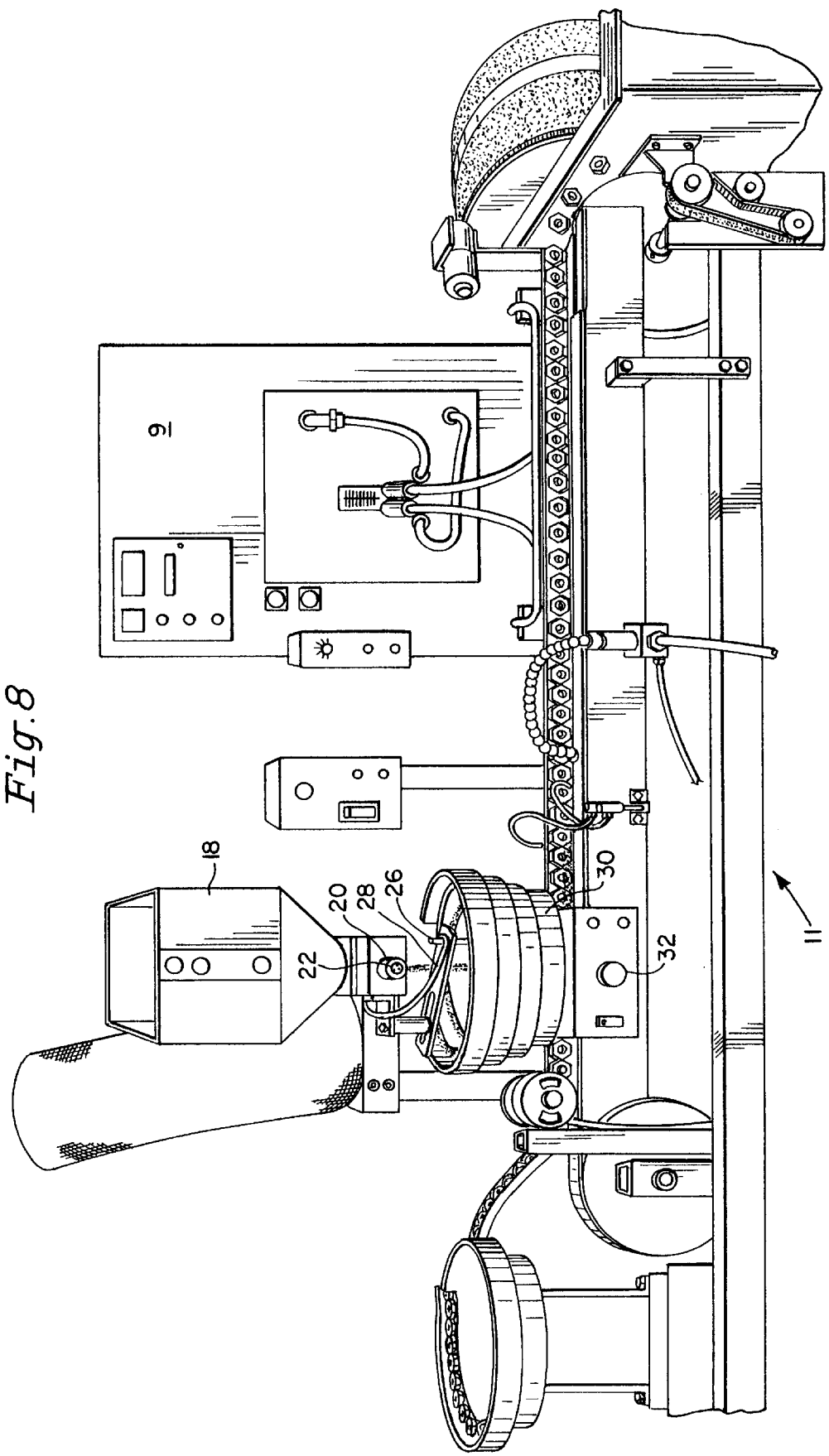
FIG. 8 is a perspective view of the present invention in combination with an apparatus and method for applying self-locking materials to a plurality of fasteners.

Referring now to the drawings and in particular FIGS. 10 and 11, a typical internally threaded fastener is illustrated that has had a coating of powdered material deposited thereon in accordance with the present invention and subsequently adhered thereto. This fastener 12 is illustrated as exemplary of only one of the many different types of articles and coatings that can be achieved in connect ion with the improved powder coating apparatus and method of the present invention. It should be noted that the present invention can be beneficially used to deposit all manner of fine powdered material onto a variety of different articles. Coating materials deposited by the present invention can serve various purposes including, but not limited to, masking, insulating, lubricating, and/or increasing the torsional resistance of the articles.

A particularly preferred use of the present invention is to deposit thermoplastic type powdered material such as nylon onto a succession of discrete articles such as threaded fasteners or studs in order to give them self-locking or insulating characteristics. The present invention can be utilized to provide coating material to either the entire article to be coated or a selected portion thereof. The articles are either heated prior to and/or after the powdered material is delivered to the article in accordance with the present invention such that the coating material will adhere to the article and coalesce.

Referring now to FIG. 1, the apparatus of the present invention is generally disclosed. The apparatus 10 includes a powder supply bin 18, optical sensor assembly 33, a vibratory bowl that is connected to a controller 32, and a powder feeder exit area 34. Referring now to FIGS. 1, 4, 5, 7 and 9, the present invention will be described in more detail. Powdered material 16 is contained in the powder supply bin 18 and is exited from the powder block 20 by auger 22 that urges powder material 16 out through an opening 23 in the block 20. The auger 22 is rotated in response to the optical sensor assembly 24, which is connected to the powder block 20 and is positioned partly within the vibratory powder feeder 30 and out of contact with both the feeder 30 and the material 16 in the bottom of the feeder 30.

The optical sensor arm 28 holds and connects the optical sensor 26, which extends into the vibratory powder feeder 30. The optical sensor 26 is positioned vertically above the bottom 31 of the feeder 30 and the sensor 26 is directed toward the bottom 31 of the powder feeder 30 and senses the distance between the powdered material 16 in the bottom 31 of the feeder 30 and the sensor 26. Each time the optical sensor 26 senses that an insufficient amount of powdered material 16 is present in the bottom 31 of the feeder 30, then it causes the auger 22 to move in the powder block 20 and force more powdered material 16 to drop into the bottom 31 of the feeder 30. Although many different photoelectric sensors can be used, a particularly preferred sensor, for the purposes of this invention, was found to be an OMRON photoelectric switch (Model E3A2-XCM4T).

It is important to utilize the optical sensor 26 to insure that the level of powdered material 16 present in the bottom 31 of the feeder 30 is maintained virtually constant to attain all of the benefits of the present invention in terms of consistency of powder flow. The precision control offered by the present invention enables this. Powdered material 16 is most preferably supplied to the bottom 31 of the feeder 30 at a rate slightly faster than the rate at which material 16 is exited down the delivery tube 36.

The vibratory powder feeder 30 is of a stepped construction, in the nature of an inside track cascading vibratory bowl. The feeder 30 is vibrated and regulated through the use of a controller 32. A preferred controller has been found to be a variable speed DC motor such as an FMC Centron controller. As illustrated in FIGS. 1 and 4, the vibratory action of the motor upon the feeder 30 causes powder material 16 deposited initially at the bottom 31 of the feeder 30 to move upwardly along the entire length of a track 42. The track 42 begins at the bottom 31 and extends in a spiralling manner to the top of the feeder 30 into the powder feeder exit area 34. The track 42 is preferably of a substantially constant width along its entire length and has a substantially flat bottom 48 and side wall 52. Although a variety of widths of the track are acceptable, a preferred range of widths of about one to three inches has been found to be most beneficial when the coating powder used is either pure nylon or a nylon epoxy resin.

As best illustrated in FIGS. 1 and 5, the track 42 can be angled slightly toward the side wall 52 so as to keep the powder material 16 on the track 42 moving toward the powder feeder exit area 34 and prevent it from falling back to the bottom 31 of the feeder 30 before it reaches the area 34. As the powdered material 16 travels from the bottom 31 of the powder feeder 30 all the way up the spiral track 42 to the feeder exit area 34, substantially all of the particles of powdered material 16 that may have become agglomerated as a result of moisture or other foreign matter are freed by the time they reach the powder feeder exit area 34. In addition, the rate of flow of the powdered material 16 is controlled by the use of the controller 32 that is able to very precisely set the rate of vibration of the powder flow and also the optical sensor assembly 33 that finely meters an adequate supply of powder to the bottom 31 of the feeder 30 from the supply bin 18 regardless of the vibration rate or rate of flow of the material 16 through the exit area 34.

The flow of powder material 16 from the feeder 30 can be regulated by varying the rate of vibration of the feeder 30 alone or in combination with an optional flow rate control device. An example of such a device consists of a deflector 45 adjustably attached to a boss 44 in the exit area 34 of the feeder 30 by a fastening element 46. Both the height and the angle of deflector 45 in relation to the track 42 are adjustable. Deflector 45 serves to limit the flow of material 16 vibrated along the track 42 to the exit area 34. Deflector 45 accomplishes this by directing substantially all of the material 16 that extends above the bottom of the deflector 45 onto the slide 40. The slide 40 is secured to the inside of the feeder 30. The slide 40 guides material 16 deposited by the deflector 45 thereon to the bottom 31 of the feeder 30 so that it may again be vibrated along the track 42 to the exit area 34. The remaining material 16 that passes by the deflector 45 then drops down the powder feeder delivery tube 36 and is subsequently guided by the powder delivery chute 38 under the force of gravity alone, to be deposited onto fasteners 12 moving for example along a conveyor 60. The deflector 45 serves to provide the present invention with an infinitely adjustable mechanism to precisely meter the flow of powdered material 16 that is virtually free of agglomerated particles.

The powder feeder delivery tube 36 can be a standard pipe that allows a narrow path of delivery to the powder chute 38 and is wide enough so as to be connected to and accept and direct all of the powder material 16 leaving the powder exit area 34, down the tube 36 without impediment. A ⅛" thick copper tube has been found particularly useful for this purpose. The powder chute 38 is connected to the end of the tube 36 farthest away from the powder exit area and can be made of any rigid material and preferably has a smooth surface or has been treated with a nonstick material in order to allow free fall of the powder material 16 onto fasteners 12. The width of the chute 38 may vary with the most preferable chutes being on the order of one to three inches wide. The angle of delivery of the chute 38 may be adjusted with optimal angles found to have been on the order of 45°.

This unique powder feed system of the present invention affords several advantages. It has been found that the vibratory action of the feeder 30 that the material 16 encounters along the entire spiralling track 42 from the bottom 31 to the top of the feeder 30 tends to substantially keep the material 16 from agglomerating. In addition, this action also tends to separate substantially all of the particles that may have joined together as a result of the presence of foreign materials on the surface of the particles or other reasons by the time the material 16 exits the feeder 30.

As a result, the powder material 16 exited from the feeder 30 through the chute 38 onto the fasteners does not require a combination with an airstream, as do most prior art systems of this type. In addition, a particularly uniform flow of powder is maintained, virtually eliminating the pulsing action found in many prior art recirculating powder systems that require an airstream to be combined with the powdered material. A more uniform and consistent application of powdered material 16 to the fasteners 12 is thereby accomplished leading to more consistent, economical, and efficient application of coating material and powder utilization.

Powder flows in accordance with the present invention are in the range of 80–400 grams/minute with the most preferred range being around 350 grams/minute. The powder feed system of the present invention affords yet another advantage over the prior art systems. It should be understood that the powder material 16 used in conjunction with the present invention could be any type of thermoplastic including nylon, nylon epoxy resins, and TEFLON® (polytetrafluoroethelene) compounds.

As illustrated in FIGS. 1 and 6, the powder feeder 30 and powder supply bin 18 form two important parts of the recirculating powder system 78 of the present invention. This system 78 is particularly adaptable for use in an apparatus for forming patches of resilient material on internally threaded fasteners such as is referred to generally as 11 in FIG. 8. In such an apparatus powdered material 16 is applied to fasteners 12 through chute 38 in an amount in excess of that required to form the desired patch 14. Air generating system 9 provides the air flow and vacuum forces to the system 78. As the fasteners 12 travel further along the conveyor belt 60, they encounter airstreams 90 and 92 generated by a source of pressurized air and excess powder material 16 is removed, such as by vacuum through nozzle 62 and tube 63, nozzle 64 and tube 65, nozzle 66 and tube 67, and tube 68; the powdered material 16 is directed into the powder recirculation conduit 70. The powdered material 16 is then directed from the conduit 70 into a recirculating powder supply 74 where it is combined with powder material 16 that has not previously been recirculated and is supplied through a recirculating powder connector 76 to the powder supply bin 18 for ultimate deposit into the bottom 31 of the feeder 30. This recirculating powder system 78 allows for efficient and economical usage of powder. Any of a number of different types of nozzles could be used in such a system, including slotted nozzles, nozzles with rows of holes, or copper or plastic tubing.

Since in accordance with this embodiment of the recirculating delivery system 78 all material 16 is applied and excess material is removed prior to any application of heat to the fasteners 12, none of the material 16 that is recirculated or ultimately applied is ever in a previously melted state or fused by heat to other powder particles prior to formation of the patch 14. Likewise, when heated, plated fasteners commonly exude smoke that contains moisture and oil. Since the vacuum nozzles of the recirculating powder system of the present invention remove powder from unheated fasteners, the nozzle and powder system do not ingest any moisture and oil filled smoke into the powder system. This leads to an improvement in both reusability and the consistency in quality of the powder flow of the present invention to the fasteners 12. Although the recirculating powder system 78 described above is particularly preferred it should be understood that other recirculating systems such as using the conduit 70 to direct material into a separate bin, the contents of which are then deposited into the powder supply bin 18 at regular intervals, could also be used.

An alternative embodiment of the present invention is illustrated in FIG. 2. In this embodiment of the invention the spiralling track 42 of the vibratory feeder 30 contains not only a bottom 48 and a back side wall 52, but also an inner wall 50 to assist in containing the powdered material as it travels along the track 42. In this embodiment, the bottom 48 of the track 42 can be substantially perpendicular to both the side wall 52 and the inner wall 50 if desired in order to eliminate the need to slightly angle the track bottom 48 towards the side wall 52. The inner wall 50 serves to keep the powdered material 16 along the spiral track 42 until it reaches the powder feeder exit area 34 and thereby prevents it from falling from the track bottom 48 onto lower levels of the track or the bottom of the powder feeder 31.

As illustrated in FIG. 3, the powder coating apparatus of the present invention can also be used in connection with known devices such as an air nozzle system 80. Such a system is typically provided with a powder funnel 82 that directs the powdered material 16 that is exited from the vibratory feeder 30 through the delivery tube 36 into a chamber. The chamber is supplied with a pressurized airstream. The airstream combines with the powder 16 the chamber to be discharged through a nozzle in the direction of discrete articles such as threaded fasteners. In this embodiment of the present invention the beneficial powder feeding characteristics of the present invention through the use of a vibratory feeder in terms of elimination of substantially all agglomeration of particles and maintaining a continuous even flow without pulsing can be utilized in connection with known devices where a high pressure forced air powder deposition system is desired. This embodiment of the present invention is particularly useful to provide coating materials onto preheated fasteners such as studs or screws.

The apparatus and method of the present invention enables the deposition of powdered material in an efficient and highly uniform manner either through a gravity drop or through a spray nozzle. The apparatus and method eliminates much of the pulsing action and agglomeration found in prior powder coating delivery systems. While preferred embodiments of the present invention have been illustrated and described, it will be understood that changes and modifications may be made therein without departing from the invention in its broadened aspects.

I claim:

1. An apparatus for directing powdered material toward a portion of a fastener to form a coating thereon comprising:

a vibratory feeder bowl having a side wall, a closed bottom, and a substantially open top;

a spiral track in said bowl that extends from the bottom of said bowl to the top of said bowl;

means for sensing an amount of said material in the bottom of said bowl that generates a signal when said material therein is not at a preselected substantially constant level, said sensing means being out of contact with both said bowl and said material in said bottom of said bowl;

means responsive to said signal generated by said sensing means for adding additional said powdered material to said bottom of said bowl;

means for vibrating said bowl to urge the powdered material along said track at a selectively adjustable rate; and means for exiting said powdered material from said bowl located near the top of said bowl.

2. The apparatus of claim 1 further comprising:

an adjustable means for limiting an amount of the powdered material exited from said bowl.

3. The apparatus of claim 2 wherein said adjustable means for limiting comprises:

means for directing a selected portion of said powdered material limited by said limiting means back to the bottom of said bowl prior to the exiting of said powdered material from said bowl.

4. The apparatus of claim 1 wherein said sensing means is positioned vertically above the bottom of said bowl.

5. The apparatus of claim 1 wherein said sensing means is an optical sensor.

6. The apparatus of claim 5 wherein said optical sensor senses a distance between the powdered material in the bottom of said bowl and said sensor.

7. The apparatus of claim 1 further comprising:

means for removing any excess said powdered material from an area around said fastener to be coated; and means for returning the powder removed by said removing means to said bowl.

8. The apparatus of claim 7 wherein said returning means comprises a vacuum nozzle and a tube connected thereto.

9. The apparatus of claim 1 wherein said track has an inner wall.

10. The apparatus of claim 1 wherein said track is substantially flat.

11. The apparatus of claim 1 wherein said track is not perpendicular to said side wall of said bowl.

* * * * *